United States Patent [19]

Feller

[11] Patent Number: 5,466,112

[45] Date of Patent: Nov. 14, 1995

[54] COMBINED DUMP TRUCK AND SPREADER APPARATUS

[76] Inventor: Richard L. Feller, 1051 W. 7th St., Monroe, Wis. 53566

[21] Appl. No.: 209,569

[22] Filed: Mar. 11, 1994

[51] Int. Cl.$^6$ .............................. B60P 1/04; B60P 1/36
[52] U.S. Cl. .................. 414/528; 414/489; 239/657
[58] Field of Search ................. 414/502, 527, 414/528, 489, 491; 239/657, 672

[56] References Cited

U.S. PATENT DOCUMENTS

| | | | |
|---|---|---|---|
| Re. 25,709 | 1/1965 | Swenson et al. | 414/528 X |
| 2,577,310 | 12/1951 | Connelly | 414/528 |
| 2,697,609 | 12/1954 | Chase et al. | 414/528 X |
| 2,988,368 | 6/1961 | Kerr | 414/528 X |
| 3,300,068 | 1/1967 | Tarrant, Sr. | 414/528 |
| 3,377,030 | 4/1968 | Swenson | 414/528 X |
| 3,498,486 | 3/1970 | Freeman, Jr. | 414/528 X |
| 3,583,646 | 6/1971 | Bogenschutz | 239/672 X |
| 4,056,283 | 11/1977 | Pow | 239/657 X |
| 4,886,214 | 12/1989 | Musso, Jr. et al. | 414/489 X |
| 4,995,773 | 2/1991 | Lamoureux et al. | 414/528 X |
| 5,286,158 | 2/1994 | Zimmerman | 414/528 X |

FOREIGN PATENT DOCUMENTS

| | | | |
|---|---|---|---|
| 2658765 | 8/1991 | France | 414/527 |

Primary Examiner—William E. Terrell
Assistant Examiner—James W. Keenan
Attorney, Agent, or Firm—David J. Archer

[57] ABSTRACT

A combined dump truck and spreader apparatus is disclosed for selectively dumping and spreading materials. The apparatus includes a truck chassis and a body for receiving and dispensing the materials. The body has a first and a second end and a first and second side. The body is secured to the chassis and a tailgate is secured to the first end of the body. A first and second conveyor are disposed within the body and extend between the first and second ends thereof for conveying the materials along the body. The tailgate defines a first and a second opening which co-operate respectively with the first and the second conveyor for permitting the flow therethrough of the materials. The arrangement is such that selective spreading and dumping of the materials from at least one of the openings is permitted. A sloping guide extends between the conveyors for guiding the materials towards the conveyors.

18 Claims, 5 Drawing Sheets

COMBINED DUMP TRUCK AND SPREADER APPARATUS

BACKGROUND OF THE INVENTION

1. Field of the Invention

The present invention relates to a combined dump truck and spreader apparatus for selectively dumping and spreading materials. More specifically, the present invention relates to a combined dump truck and spreader apparatus for spreading salt and sand and the like on roadways.

2. Information Disclosure Statement

In a typical prior art spreader apparatus, a V-box type spreader is mounted within the body of a dump truck.

The aforementioned V-Box spreader includes a longitudinally extending conveyor disposed adjacent to the base of the V-box. The arrangement is such that the conveyor conveys materials along the V-box towards the back of the truck in a controlled manner. The materials which typically include sand and salt are dispensed by the conveyor through a guide chute and are dispersed by means of a rotary spinner which spreads the materials across the roadway being treated. However, such V-box spreaders have certain inherent disadvantages. More particularly, in adverse weather conditions with ice and snow covering a roadway, a problem exists when there is insufficient traction between the truck carrying the V-box spreader and the road.

Various relatively complex arrangements have been proposed in order to supply a quantity of sand and salt ahead of the rear wheels of the truck in order to increase the traction thereof.

Another problem with the prior art arrangements is that the considerable capacity of a typical dump truck body is not utilized when fitted with a V-box spreader.

Accordingly, the present invention provides a unique combination of a dump truck and a spreader.

In its basic concept, the present invention includes a truck body having a first and second conveyor means with a sloping floor therebetween. The conveyor means convey the materials through respective openings for spreading thereof. Additionally, the materials can be dumped through the openings. However, in an other embodiment of the present invention, the apparatus not only permits the dispensing of sand and salt from the rear of the truck for normal spreading operations but also provides means for spreading the materials ahead of the rear wheels thereby enhancing the traction thereof.

Furthermore, in yet another embodiment of the present invention, the apparatus enables the rapid unloading of the materials from the truck body by a dumping operation which includes hoisting the body so that the materials flow from the body past a tailgate.

According to the present invention, the combined unit is able to move safely, economically and quickly, thereby allowing the user thereof to spread sand, salt or a variety of other products without having to raise or tilt the body or add additional equipment to perform the aforementioned functions.

Additionally, the apparatus according to the present invention doubles as a regular dump truck without having to remove bulky add-on spreading equipment.

The aforementioned apparatus according to the present invention permits spreading of the materials with up to four spinners. The conveyors in one embodiment run forward or backward thereby allowing the dumping of materials to the rear only, front only, or both front and rear. Such an arrangement allows the operator to spread sand mixed with salt ahead of the drive tires for traction on slippery surfaces or when going up steep hills or inclines while spreading the load from the rear end of the truck at the same time.

On most prior art front discharge sander spreaders, it is necessary to raise the body forward or tilt the body sideways to accomplish front spreading. Such forward or sideways tilting introduces safety problems because changing either the vertical or horizontal center of gravity tends to make the truck less stable.

Also, when the body of the prior art truck arrangement is raised for spreading, there exists the danger of hitting trees, bridges, powerlines and the like.

The apparatus according to the present invention enables complete operation and control of the spreading and dump modes so that the apparatus can be converted from the spreading mode to the dumping mode from inside the cab. Most prior art arrangements having front discharge spreaders make it necessary for the operator to go outside the cab in order to change a series of levers and latches to convert the apparatus.

Also, with the apparatus according to the present invention, the center of gravity is lower than with the prior art V-box spreader arrangement. The body of the apparatus has a greater capacity than the capacity of a V-box spreader mounted on a dump body because with the V-box spreader, the walls thereof are inclined at 45 degrees whereas with the dump body, the walls are vertical.

Furthermore, usually in the prior art arrangements, the V-box spreader is located in the truck body and thus the truck is designated for long periods as a spreader unit only with no dump capability.

In essence, the apparatus according to the present invention permits spreading to the front and/or rear with a better center of gravity, with less weight and more capacity while easily converting to a dump mode.

Therefore, the primary objective of the present invention is to provide a combined dump truck and spreader apparatus that overcomes the aforementioned inadequacies of the prior art arrangements and which makes a considerable contribution to the art of dumping materials from a truck and for spreading sand, salt and the like materials on a roadway to the front or rear.

Other objects and advantages of the present invention will be readily apparent to those skilled in the art by a consideration of the detailed description contained hereinafter taken in conjunction with the annexed drawings.

SUMMARY OF THE INVENTION

The present invention relates to a combined dump truck and spreader apparatus for selectively dumping and spreading materials. The apparatus in one embodiment of the invention includes a truck chassis and a body for receiving and dispensing the materials. The body has a first and a second end and a first and a second side. The body is secured to the chassis and a tailgate is secured to the first end of the body.

A first and second conveyor means are disposed within the body. Each of the conveyor means extends between the first and second ends of the body for conveying the materials along the body.

The tailgate defines a first and a second opening which cooperate respectively with the first and second conveyor means for permitting the flow therethrough of the materials. The arrangement is such that selective spreading and dumping of the materials from at least one of the openings is permitted.

A sloping guide means extends between the conveyor means for guiding the materials towards the conveyor means.

In another embodiment of the present invention, the body is secured about a pivotal axis which extends normal to the sides. Also, the tailgate is secured to the first end of the body about a further pivotal axis which is disposed spaced and parallel to the pivotal axis. The arrangement is such that when the tailgate is in a closed disposition thereof the materials are contained within the body. However, when the tailgate is pivoted about the further pivotal axis to an open disposition thereof, dumping of materials from the body past the tailgate is permitted.

Additionally, means for dumping extend between the body and the chassis for selectively pivoting the body about the pivotal axis such that when the tailgate is disposed in the open disposition, dumping of the materials is permitted.

In a more specific embodiment of the present invention, the truck chassis includes a first and a second support beam. The beams are disposed spaced and parallel relative to each other in a direction from the first end towards the second end of the body.

The body includes a subframe which includes a first and a second support member. The support members extend in a direction between the ends of the body. The members are disposed spaced and parallel relative to each other.

The pivotal axis extends through the first and second support beam and the first and second support member. The pivotal axis is disposed adjacent to the first end of the body.

The sides of the body are disposed substantially parallel and spaced relative to each other and the tailgate extends from the first to the second side of the body. Additionally, the tailgate has a top and a bottom edge with the further pivotal axis being disposed adjacent to the top edge of the tailgate.

Also, the tailgate includes locking means for releasably locking the tailgate in the closed disposition thereof.

The means for dumping includes a pair of arms which are disposed parallel and spaced relative to each other. The pair of arms have a first and a second extremity. The first extremity of the pair of arms is pivotally secured to the chassis about the first dumping means axis.

A further pair of arms are disposed parallel and spaced relative to each other with the further pair of arms having a first and a second end zone. The first end zone is pivotally secured to the second extremity about a second dumping means axis. The second end zone is pivotally secured to the body about a third dumping means axis.

Hydraulic cylinder means extend between the first dumping means axis and a fourth dumping means axis which is disposed between the second and third dumping means axes. The arrangement is such that the dumping means axes are disposed spaced and parallel relative to each other so that when the cylinder means is operated, the body is pivoted about the pivotal axis.

The first and second conveyor means each include a first and second chain. The chains are disposed spaced and parallel relative to each other between the sides of the body.

A plurality of materials moving slats are disposed such that each slat extends between the chains.

A first sprocket means co-operates with the chains and is disposed adjacent to the first end of the body for guiding the chains.

A second sprocket means co-operates with the chains and is disposed adjacent to the second end of the body for guiding the chains.

Drive means are connected to at least one of the sprocket means for independently driving each of the conveyor means.

More specifically, the drive means includes a drive motor which is associated with each of the first and second sprocket means.

Also, means such as a gearbox, direct drive or another type of transmission is operatively connected between each of the drive motors and associated sprocket means. The arrangement is such that movement of each of the conveyor means for moving the materials in either directions between the ends of the body is permitted.

The tailgate also includes deflector means secured to a bottom edge of the tailgate for deflecting the materials within the body towards the conveyor means. The deflector means includes a gate means for selectively controlling the flow of materials through the first opening.

Further deflector means are secured to the bottom edge of the tailgate for deflecting the materials within the body towards the second conveyor means.

The further deflector means includes a further gate means for selectively controlling the flow of materials through the second opening.

The sloping guide means is preferably an inverted V-shaped deflector which extends between the ends of the body. The arrangement is such that when the materials are received within the body, the deflector deflects the materials towards the first and second conveyor means.

The body further includes first and second longitudinally extending fillets which are disposed between the first side and the first conveyor means and the second side and the second conveyor means respectively for guiding the materials onto the conveyor means.

Additionally, the body also includes first and second removable covers which are slidably received on the first and second conveyor means respectively. The arrangement is such that when the conveyor means are inoperative, the covers prevent the flow of materials onto the conveyor means.

Also, the second end of the body defines a first and second aperture. The apertures co-operate respectively with the first and the second conveyor means for permitting the flow therethrough of the materials. The arrangement is such that selective spreading of the materials through at least one of the openings and apertures is permitted so that when the materials flow through at least one of the apertures, spreading of the materials from the second end of the body is permitted for increasing the traction of the combined apparatus.

Many modifications and variations of the present invention will be readily apparent to those skilled in the art by a careful consideration of the detailed description contained hereinafter taken in conjunction with the annexed drawings. However, such modifications and variations fall within the spirit and scope of the present invention as defined by the appended claims.

Included in such modifications would be the provision of hydraulic motors for driving one or more of the conveyor means. The provision of variable speed motors so that rapid dumping of the materials through the openings is permitted.

Also, although specific dumping means are disclosed herein, any arrangement for raising the body could be used including those hoists endorsed by the National Truck Equipment Association for performing within specified performance ranges for particular truck body dimensions.

The present invention provides a multitude of combinations each suitable for a particular application. For example, the present invention includes an arrangement in which no hoist is provided for the dump body and in which the materials can alternatively be spread or dumped through the openings.

BRIEF DESCRIPTION OF THE DRAWINGS

Similar reference characters refer to similar parts throughout the various views of the drawings.

DETAILED DESCRIPTION OF THE DRAWINGS

Figure 1:
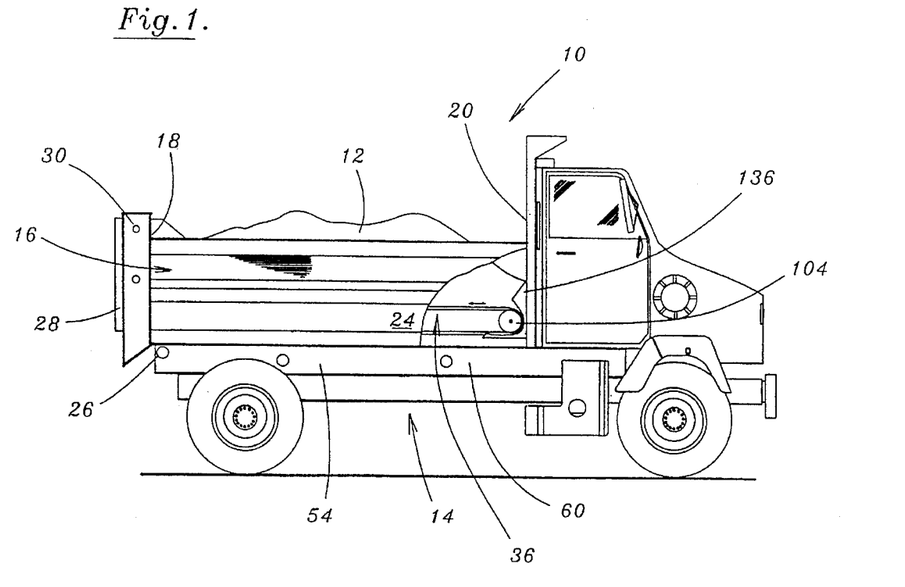
FIG. 1 is a side elevational view of a combined dump truck and spreader apparatus according to the present invention.

FIG. 1 is a side elevational view of a combined dump truck and spreader apparatus generally designated 10 according to the present invention for selectively dumping and spreading materials 12.

Figure 3:
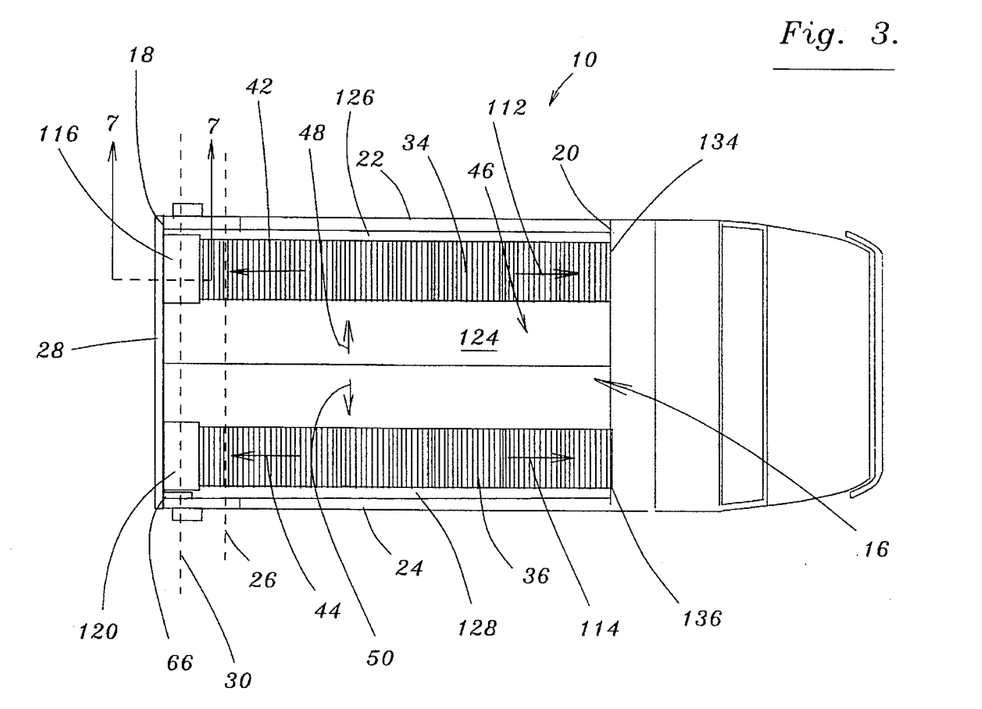
FIG. 3 is a top plan view of the combined dump truck and spreader apparatus shown in FIG. 1.

The apparatus 10 includes a truck chassis generally designated 14 and a body generally designated 16 for receiving and dispensing the materials 12. The body 16 has a first and second end 18 and 20 respectively. The body 16 also includes a first and second side 22 and 24 respectively particularly as shown in the plan view of FIG. 3. The body 16 is secured to the chassis 14 about a pivotal axis 26 which extends normal to the sides 22 and 24 respectively particularly as shown in FIG. 3.

A tailgate 28 is secure to the first end 18 of the body 16 about a further pivotal axis 30 which is disposed spaced and parallel relative to the pivotal axis 26. The arrangement is such that when the tailgate 28 is in a closed disposition thereof as shown in FIG. 1, the materials 12 are contained within the body 16.

Figure 2:
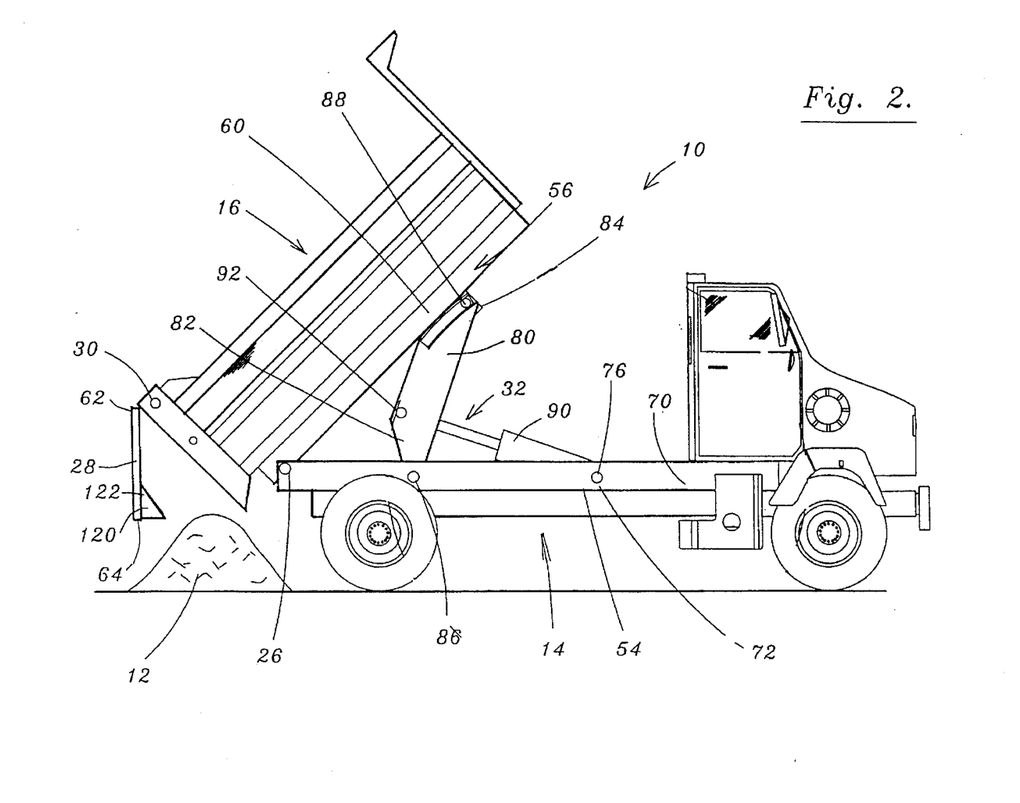
FIG. 2 is a similar view to that shown in FIG. 1 but shows the body raised so that the materials may be dumped therefrom.

However, when the tailgate 28 is pivoted about the further pivotal axis 30 to an open disposition thereof as shown in FIG. 2, dumping of the materials 12 from the body 16 past the tailgate 28 is permitted.

FIG. 2 is a similar view to that shown in FIG. 1 but shows the body 16 in the raised position thereof for dumping materials 12 from the body 16.

More specifically, FIG. 2 shows dumping means generally designated 32 extending between the body 16 and the chassis 14 for selectively pivoting the body 16 about the pivotal axis 26. The arrangement is such that, when the tailgate 28 is disposed in the open disposition as shown in FIG. 2, dumping of the materials 12 is permitted.

FIG. 3 is a top plan view of the apparatus 10 shown in FIG. 1. FIG. 3 shows a first and second conveyor means 34 and 36 disposed within the body 16 and extending between the first and second ends 18 and 20 of the body 16 for conveying materials 12 along the body 16.

Figure 4:
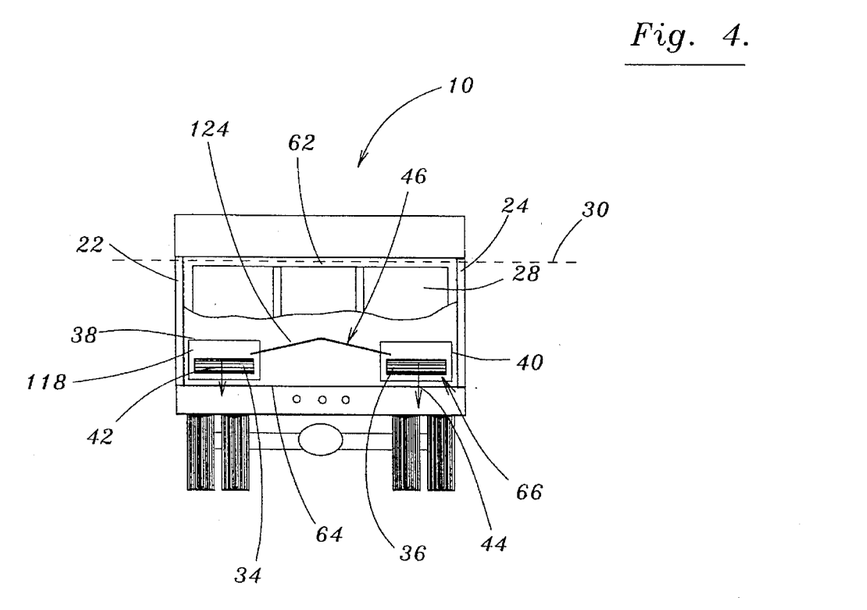
FIG. 4 is a rear view of tile apparatus shown in FIG. 1.

FIG. 4 is a view of the rear of the apparatus 10 shown in FIG. 1. FIG. 4 shows the tailgate 28 defining a first and second opening 38 and 40 respectively. The openings 38 and 40 co-operate respectively with the first and second conveyor means 34 and 36 for permitting the flow therethrough as indicated by the arrows 42 and 44 of the materials 12. The arrangement is such that selective spreading of the materials 12 from at least one of the openings 38 and 40 is permitted.

Sloping guide means generally designated 46 extend between the conveyor means 34 and 36 for guiding the materials 12 towards the conveyor means 34 and 36 as indicated by the arrows 48 and 50.

Figure 5:
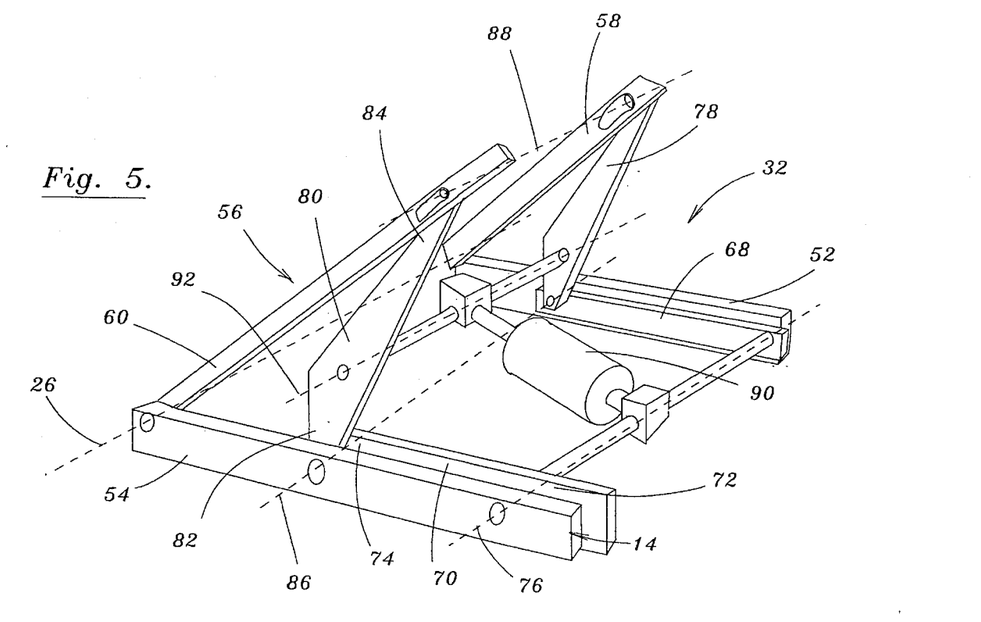
FIG. 5 is an enlarged perspective view of the dumping means according to the present invention.

More specifically, as shown in FIG. 5 the truck chassis 14 includes first and second support beams 52 and 54. The beams 52 and 54 extend parallel and spaced relative to each other in a direction from the first end 18 towards the second end 20 of the body 16 when in the lowered disposition thereof.

Additionally, as particularly shown in FIGS. 2 and 5, the body 16 also includes a subframe generally designated 56 which includes first and second support members 58 and 60 respectively extending in a direction between the ends 18 and 20 of the body 16. The members 58 and 60 are disposed spaced and parallel relative to each other.

The pivotal axis 26 extends through the first and second support beams 52 and 54 and the first and second support members 58 and 60. The pivotal axis 26 is disposed adjacent to the first end 18 of the body 16.

The sides 22 and 24 of the body 16 as shown in FIGS. 3 and 4 are disposed substantially parallel and spaced relative to each other.

The tailgate 28 extends from the first to the second side 22 and 24 respectively of the body 16 as shown FIGS. 3 and 4. Also, as shown in FIG. 4, the tailgate 28 has a top and a bottom edge 62 and 64 respectively. The further pivotal axis 30 is disposed adjacent to the top edge 62 of the tailgate 28.

The tailgate 28 includes locking means generally designated 66 for releasably locking the tailgate 28 in the closed disposition thereof as shown in FIGS. 1, 3 and 4.

As shown particularly in FIGS. 2 and 5, the dumping means generally designated 32 includes a pair of arms 68 and 70 which are disposed parallel and spaced relative to each other. The pair of arms 68 and 70 have a first and a second extremity 72 and 74 respectively. The first extremity 72 is pivotally secured to the chassis 14 about a first dumping axis 76.

A further pair of arms 78 and 80 respectively are disposed parallel and spaced relative to each other. The further pair of arm 78 and 80 have a first and second end zone 82 and 84 respectively. The first end zone 82 is pivotally secured to the second extremity 74 about a second dumping axis 86. The second end zone 84 is pivotally secured to the body 16 about a third dumping axis 88.

Hydraulic cylinder means 90 extend between the first dumping axis 76 and a fourth dumping axis 92 which is disposed between the second and third axes 86 and 88 respectively. The arrangement is such that the dumping axes are disposed spaced and parallel to each other so that when the cylinder means 90 is operated, the body 16 is pivoted about the pivotal axis 26.

Figure 6:
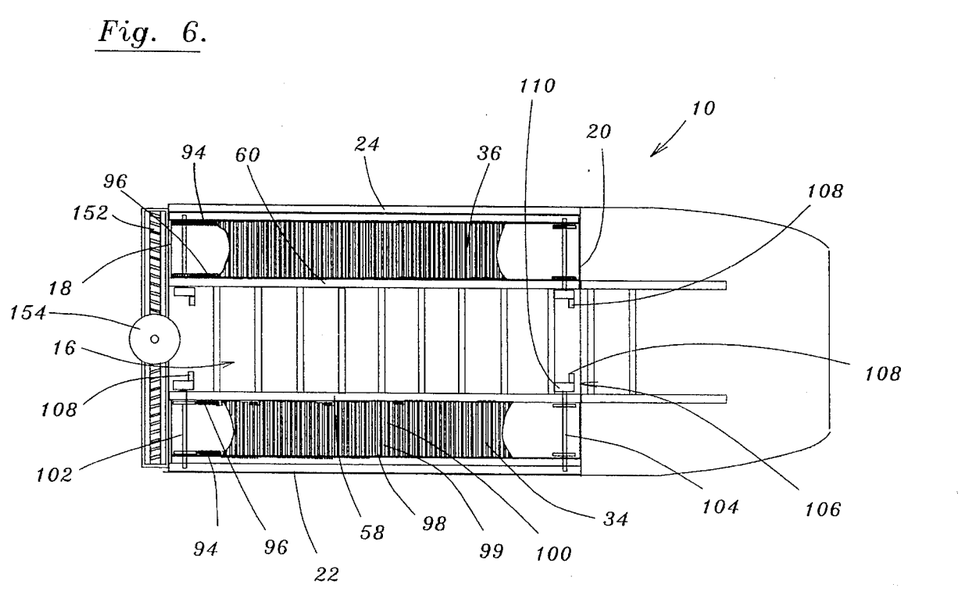
FIG. 6 is a bottom plan view of the apparatus shown in FIG. 1.

FIG. 6 is a bottom plan view of the apparatus 10. FIG. 6 shows the first and second conveyor means 34 and 36 respectively as each including a first and second chain 94 and 96. The chains 94 and 96 are disposed spaced and parallel to each other between the sides 22 and 24 of the body 16.

A plurality of materials slats 98,99, and 100 are arranged such that the slats 98 to 100 extend between the chains 94 and 96.

A first sprocket means 102 co-operates with the chains 94 and 96 and is disposed adjacent to the first end 18 of the body 16 for guiding the chains 94 and 96.

A second sprocket means 104 co-operates with the chains 94 and 96 and is disposed adjacent to the second end 20 of the body for guiding the chains 94 and 96.

Drive means generally designated 106 are connected to at least one of the sprocket means 102, 104 for independently driving the conveyor means 34 and 36.

More specifically, as shown in FIGS. 3 and 6, the drive means 106 includes a drive motor 108 which is associated with each of the first and second sprocket means 102 and 104.

Additionally, a gear box 110 is operatively connected between each of the drive motors 108 and associated sprocket means 102 and 104. The arrangement is such that movement of each of the conveyor means 34 and 36 for moving the materials 12 in either direction as indicated by the arrows 42 and 44 and 112 and 114 between the ends 18 and 20 of the body 16 is permitted.

The tailgate 28 also includes deflector means 116 rigidly secured to the bottom edge 64 of the tailgate 28 for deflecting the materials 12 within the body 16 towards the first conveyor means 34 as shown in FIGS. 2 and 3.

Figure 7:
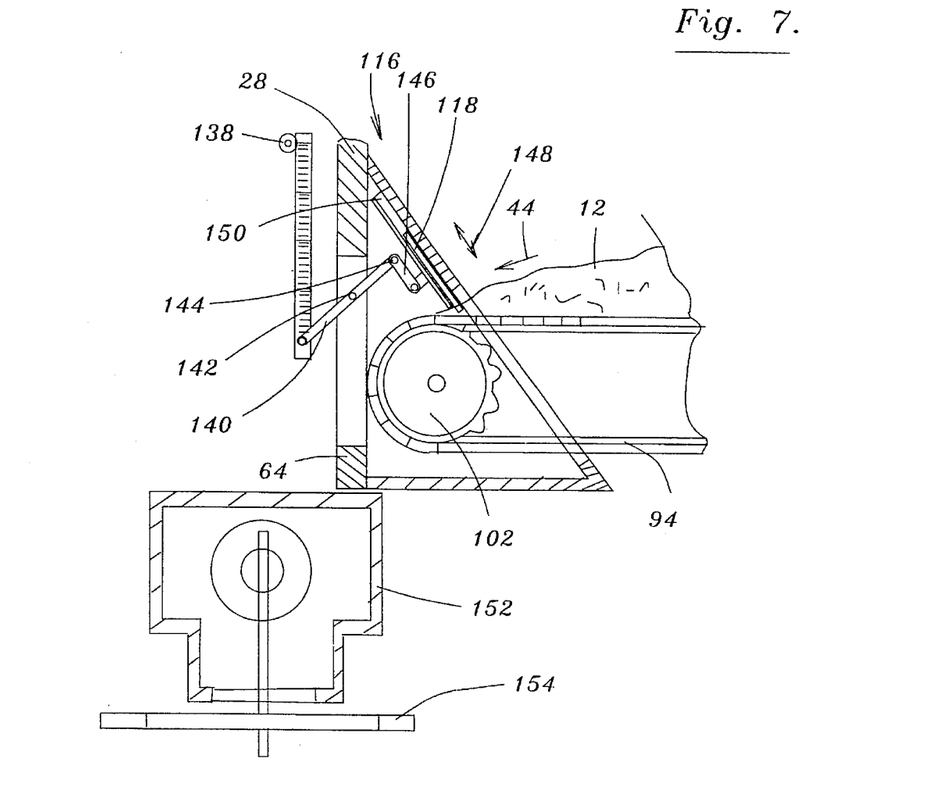
FIG. 7 is an enlarged sectional view taken on the line 7—7 of FIG. 3.

FIG. 7 is an enlarged sectional view of the deflector means 116 taken on the line 7—7 of FIG. 3. As shown in FIG. 7, the deflector means 116 includes a gate means 118 for selectively controlling the flow of materials 12 as indicated by the arrow 42 through the first opening 38.

Further deflector means 120 are rigidly secured to the bottom edge 64 of the tailgate 28 for deflecting the materials 12 within the body 16 towards the conveyor means 36.

The further deflector means 120 includes a further gate 122 for selectively controlling the flow of materials 12 as indicated by the arrow 44 through the second opening 40.

The sloping guide means 46 is an inverted V-shaped deflector 124 which extends between the ends 18 and 20 of the body 16. The arrangement is such that when the materials 12 are received within the body 16, the deflector 124 deflects the materials 12 towards the first and second conveyor means 34 and 36 respectively.

The body 16 also includes a first and second longitudinally extending fillet 126 and 128 respectively disposed between the first side 22 and the first conveyor means 34 and the second side 24 and the second conveyor means 36 respectively for guiding the materials 12 onto the conveyor means 34 and 36.

Figure 8:
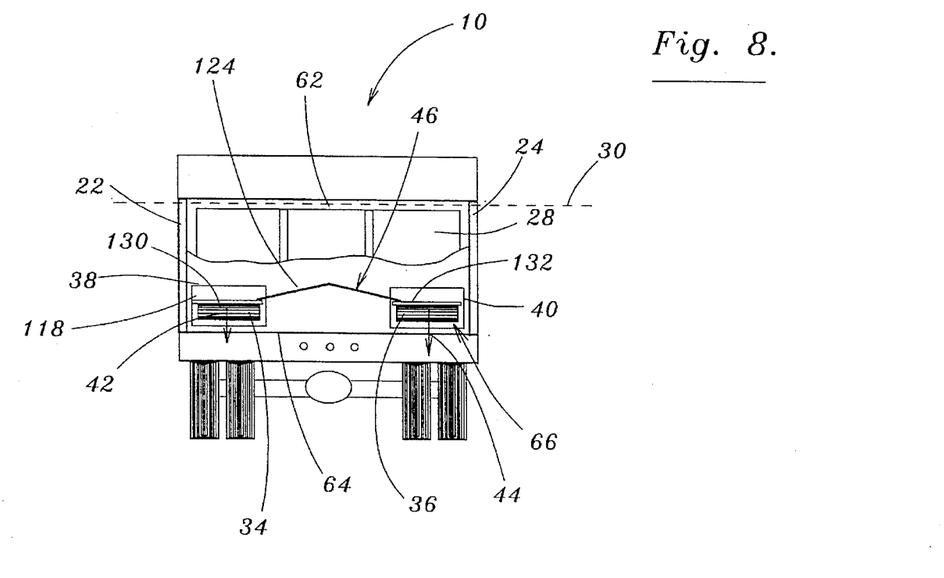
FIG. 8 is a similar view to that shown in FIG. 4 but shows removable covers on the conveyor means.

FIG. 8 is a similar view to that shown in FIG. 4 but shows additionally the body 16 as further including first and second removable covers 130 and 132 slidably received on the first and second conveyor means 34 and 36 respectively. The arrangement is such that when the conveyor means 34 and 36 are inoperative, the covers 130 and 132 prevent the flow of materials 12 onto the conveyor means 34 and 36 respectively.

The second end 20 of the body 16 also defines a first and second aperture 134 and 136 respectively as shown in FIGS. 1 and 3. The apertures 134 and 136 co-operate respectively with the first and second conveyor means 34 and 36 for permitting the flow therethrough of the materials 12. The arrangement is such that selective spreading of the materials 12 through at least one of the openings 38 and 40 and apertures 134 and 136 is permitted so that when the materials 12 flow at least through one of the apertures 134 and 136, spreading of the materials 12 from the second end 20 of the body 16 is permitted for increasing the traction of the combined apparatus 10.

FIG. 7 also shows means for adjusting the gate 118. A screw jack arrangement 138 is adjustable in a vertical direction for pivoting lever 140 about a pivot 142. A crossbar 144 is secured at the opposite end of the lever 140 relative to the screw jack 138. The crossbar 144 via links 146 causes the gate 118 to slide within guide 150 as indicated by the arrow 148. By adjusting the position of the gate 118, the flow of materials for spreading is regulated.

Those skilled in the art will appreciate that various control arrangements can be used in order to control the driving of the conveyor means 34 and 36 and that motors 108 can be controlled independently. Also, the movement of the gates can be controlled remotely as is well known in the art.

As shown in the drawings, a single auger type dispenser 152 is used at the rear of the truck with a single spinner 154 under the tailgate 28 as shown in FIG. 7. However, although the single auger feeds the materials from openings 38 and 40 towards the center above the spinner 154, it will be appreciated that a separate spinner could be used under each of the openings 38 and 40.

Figure 9:
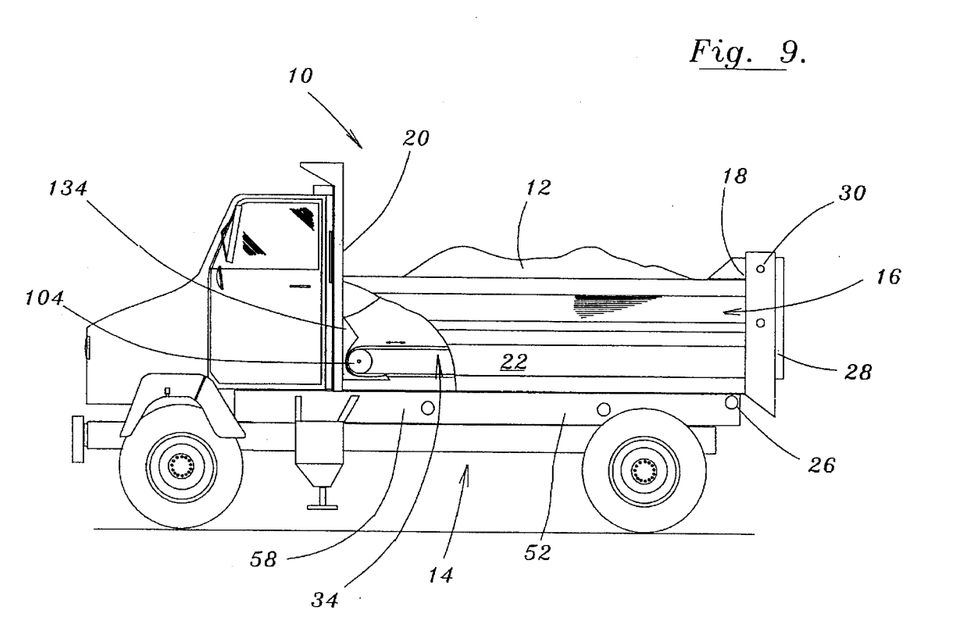
FIG. 9 is a similar view to that shown in FIG. 1 but shows the opposite side of the apparatus.

Also, although a separate spinner could be located beneath each of the apertures 134 and 136, in a preferred embodiment of the present invention, a single spinner is located beneath aperture 134 as particularly shown in FIG. 9. FIG. 9 is a view similar to that shown in FIG. 1 but shows the opposite side of the truck.

In operation of the apparatus, materials are loaded into the body 16. Normally, the materials are fed through one or more of the openings 38 and 40 so that spreading by spinner 154 is accomplished.

However, if traction difficulties are encountered on an incline, conveyor means 34 for example is reversed so that sand and salt are spread through aperture 134 ahead of the rear tires.

When the truck is required for moving materials, the dumping means is operated remotely from the cab when the locking means 66 has been released also from within the cab so that the load is dumped.

Also, if blacktop is being transported, covers 130 and 132 can be installed in order to prevent clogging of the sprocket and chain mechanism.

The present invention provides a combined dump truck and spreader apparatus in which materials can be quickly dumped from a body through the tailgate. Alternatively, the materials can be spread on either side of the truck by the conveyor means either behind the truck or ahead of the truck in order to increase traction in adverse weather conditions.

What is claimed is:

1. A combined dump truck and spreader apparatus for selectively dumping and spreading materials, said apparatus comprising:

a truck chassis;

a body for receiving and dispensing the materials, said body having a first and a second end and a first and a second side, said body being pivotally secured to said chassis about a pivotal axis;

dumping means extending between said body and said chassis for selectively pivoting said body about said pivotal axis;

a tailgate pivotally secured to said first end of said body ,about a further pivotal axis for selectively permitting dumping of the materials therethrough when said body is pivoted about said pivotal axis;

first and second conveyor means disposed within said body and extending between said first and second ends thereof for conveying the materials along said body;

said tailgate defining a first and a second opening which co-operate respectively with said first and second conveyor means for permitting the flow therethrough of the materials, the arrangement being such that selective spreading and dumping of the materials from at least one of said openings is permitted;

said tailgate further including:

deflector means secured to a bottom edge of said tailgate for deflecting the materials within said body towards said first conveyor means;

said deflector means including:

a gate means for selectively controlling said flow of materials through said first opening;

further deflector means secured to said bottom edge of said tailgate for deflecting the materials within said body towards said second conveyor means;

said further deflector means including:

a further gate means for selectively controlling Said flow of materials through said second opening; and sloping guide means extending between said conveyor means and extending between said first and second ends thereof for guiding and evenly deflecting all of the materials within said body towards said conveyor means along the entire length of said conveyor means for evenly distributing the materials to both of said conveyor means.

2. A combined dump truck and spreader apparatus as set forth in claim 1 wherein said pivotal axis extends normal to said sides.

3. A combined dump truck and spreader apparatus as set forth in claim 2 wherein said further pivotal axis is disposed spaced and parallel to said pivotal axis such that when said tailgate is in a closed disposition thereof, the materials are contained within said body and when said tailgate is pivoted about said further pivotal axis to an open disposition thereof, dumping of the materials from said body past said tailgate is permitted.

4. A combined dump truck and spreader apparatus as set forth in claim 3 wherein said tailgate extends from said first to said second side of said body, said tailgate having a top and a bottom edge, said further pivotal axis being disposed adjacent to said top edge of said tailgate.

5. A combined dump truck and spreader apparatus as set forth in claim 3 wherein said tailgate includes:

locking means for releasably locking said tailgate in said closed disposition.

6. A combined dump truck and spreader apparatus as set forth in claim 2 wherein said truck chassis includes:

first and second support beams, said beams extending spaced and parallel relative to each other in a direction from said first end towards said second end of said body.

7. A combined dump truck and spreader apparatus as set forth in claim 5 wherein said body includes:

a subframe;

said subframe including:

first and second support members extending in a direction between said ends of said body, said members being disposed spaced and parallel relative to each other.

8. A combined dump truck and spreader apparatus as set forth in claim 7 wherein said pivotal axis extends through said first and second support beams and said first and second support members, said pivotal axis being disposed adjacent to said first end of said body.

9. A combined dump truck and spreader apparatus as set forth in claim 1 wherein said sides of said body are disposed substantially parallel and spaced relative to each other.

10. A combined dump truck and spreader apparatus as set forth in claim 1 wherein said first and second conveyor means each include:

first and second chains, said chains being disposed spaced and parallel relative to each other between said sides of said body;

a plurality of materials moving slats, each slat extending between said chains;

a first sprocket means co-operating with said chains and disposed adjacent to said first end of said body for guiding said chains;

a second sprocket means co-operating with said chains and disposed adjacent to said second end of said body for guiding said chains;

drive means operably connected to at least one of said sprocket means for independently driving said conveyor means.

11. A combined dump truck and spreader apparatus as set forth in claim 10 wherein said drive means includes:

a drive motor associated with each of said first and second sprocket means;

means operatively connected between each of said drive motors and associated sprocket means, the arrangement being such that movement of each of said conveyor means for moving the materials in either direction between said ends of said body is permitted.

12. A combined dump truck and spreader apparatus as set forth in claim 1 wherein said sloping guide means is an inverted V-shaped deflector which extends between said ends of said body, the arrangement being such that when the materials are received within said body, said deflector deflects the materials towards said first and second conveyor means.

13. A combined dump truck and spreader apparatus as set forth in claim 1 wherein said body further includes:

first and second longitudinally extending fillets disposed between said first side and said first conveyor means and said second side and said second conveyor means respectively for guiding the materials onto said conveyor means.

14. A combined dump truck anti spreader apparatus as set forth in claim 1 wherein said body further includes:

first and second removable covers slidably received on said first and said second conveyor means respectively, the arrangement being such that when said conveyor means are inoperative, said covers prevent the flow of the materials onto said conveyor means.

15. A combined dump truck and spreader apparatus as set forth in claim 1 wherein said second end of said body defines first and second apertures which co-operate respectively with said first and second conveyor means for permitting the flow therethrough of the materials, the arrangement being such that selective spreading of the materials through at least one of said apertures is permitted so that when the materials flow through at least one of said apertures, spreading of the materials from said second end of said body is permitted for increasing traction of said combined apparatus.

16. A combined dump truck and spreader apparatus for selectively dumping and spreading materials, said apparatus comprising:

a truck chassis;

a body for receiving and dispensing the materials, said body having a first and a second ends and a first and second sides, said body being secured to said chassis;

a tailgate secured to said first end of said body;

first and second conveyor means disposed within said body and extending between said first and second ends thereof for conveying the materials along said body;

said tailgate defining first and second openings which co-operate respectively with said first and second conveyor means for permitting the flow therethrough of the materials, the arrangement being such that selective spreading and dumping of the materials from at least one of said openings is permitted;

said tailgate further including;

deflector means secured to a bottom edge of said tailgate for deflecting the materials within said body towards said first conveyor means;

said deflector means including:

a gate means for selectively controlling said flow of materials through said first opening;

further deflector means secured to said bottom edge of said tailgate for deflecting the materials within said body towards said second conveyor means;

said further deflector means including:

a further gate means for selectively controlling said flow of materials through said second opening;

sloping guide means extending between said conveyor means for guiding the materials towards said conveyor means;

said body being secured to said chassis about a pivotal axis extending normal to said sides said tailgate being secured to said first end of said body about a further pivotal axis disposed spaced and parallel to said pivotal axis such that when said tailgate is in a closed disposition thereof, the materials are contained within said body and when said tailgate is pivoted about said further pivotal axis to an open disposition thereof, dumping of the materials from said body past said tailgate is permitted;

dumping means extending between said body and said chassis for selectively pivoting said body about said pivotal axis such that when said tailgate is disposed in said open disposition, dumping of the materials is permitted;

said dumping means including:

a pair of arms disposed parallel and spaced relative to each other, said pair of arms having first and second extremities, said first extremity being pivotally secured to said chassis about a first dumping axis;

a further pair of arms disposed parallel and spaced relative to each other, said further pair of arms having first and second end zones, said first end zone being pivotally secured to said second extremity about a second dumping axis, said second end zone being pivotally secured to said body about a third dumping axis; and hydraulic cylinder means extending between said first dumping axis and a fourth dumping axis disposed between said second and third dumping axes, the arrangement being such that said dumping axes are disposed spaced and parallel relative to each other so that when said cylinder means is operated, said body is pivoted about said pivotal axis.

17. A combined dump truck and spreader apparatus for selectively dumping and spreading materials, said apparatus comprising:

a truck chassis;

a body for receiving and dispensing the materials, said body having first and second ends and first and second sides, said body being secured to said chassis about a pivotal axis extending normal to said sides;

a tailgate secured to said first end of said body about a further pivotal axis disposed spaced and parallel to said pivotal axis such that when said tailgate is in a closed disposition thereof, the materials are contained within said body and when said tailgate is pivoted about said further pivotal axis to an open disposition thereof, dumping of the materials from said body past said tailgate is permitted;

dumping means extending between said body and said chassis for selectively pivoting said body about said pivotal axis such that when said tailgate is disposed in said open disposition, dumping of the materials is permitted;

first and second conveyor means disposed within said body and extending between said first and second ends thereof for conveying the materials along said body;

said tailgate defining first and second openings which co-operate respectively with said first and second conveyor means for permitting the flow therethrough of the materials, the arrangement being such that selective spreading of the materials from at least one of said openings is permitted; and sloping guide means extending between said conveyor means and extending between said first and second ends thereof for guiding and evenly deflecting all of the materials within said body towards said conveyor means along the entire length of said conveyor means for evenly distributing the materials to both of said conveyor means.

18. A combined dump truck and spreader apparatus for selectively dumping and spreading materials, said apparatus comprising:

a truck chassis;

a body for receiving and dispensing the materials, said body having a first and a second end and a first and second side, said body being secured to said chassis about a pivotal axis extending normal to said sides;

a tailgate secured to said first end of said body about a further pivotal axis disposed spaced and parallel to said pivotal axis such that when said tailgate is in a closed disposition thereof, the materials are contained within said body and when said tailgate is pivoted about said further pivotal axis to an open disposition thereof, dumping of the materials from said body past said tailgate is permitted;

dumping means extending between said body and said chassis for selectively pivoting said body about said pivotal axis such that when said tailgate is disposed in said open disposition, dumping of the materials is permitted;

first and second conveyor means disposed within said body and extending between said first and second ends thereof for conveying the materials along said body;

said tailgate defining first and second openings which co-operate respectively with said first and second conveyor means for permitting the flow therethrough of the materials, the arrangement being such that selective spreading of the materials from at least one of said openings is permitted;

sloping guide means extending between said conveyor means and extending between said first and second ends thereof for guiding and evenly deflecting all of the materials within said body towards said conveyor means along the entire length of said conveyor means for evenly distributing the materials to both of said conveyor means; and said second end of said body defining first and second apertures which co-operate respectively with said first and second conveyor means for permitting the flow therethrough of the materials, the arrangement being such that selective spreading of the materials through at least one of said apertures is permitted so that when the materials flow through at least one of said apertures, spreading of the materials from said second end of said body is permitted for increasing traction of said combined apparatus, the apparatus permitting dumping of the materials therefrom when said dumping means pivots said body to said open disposition thereof.

* * * * *

UNITED STATES PATENT AND TRADEMARK OFFICE
CERTIFICATE OF CORRECTION

PATENT NO. : 5,466,112
DATED : November 14, 1995
INVENTOR(S) : Richard L. Feller It is certified that error appears in the above-indentified patent and that said Letters Patent is hereby corrected as shown below:

Column 5, line 22 "tile" should read --the--

Column 9, line 36 "Said" should read --said--

Signed and Sealed this

Twentieth Day of February, 1996

Attest:

BRUCE LEHMAN

Attesting Officer    Commissioner of Patents and Trademarks